(12) United States Patent
Ahmed et al.

(10) Patent No.: US 8,442,095 B2
(45) Date of Patent: May 14, 2013

(54) MULTIPLE CORRELATION PROCESSING IN CODE SPACE SEARCH

(75) Inventors: Rizwan Ahmed, Alexandria, VA (US); Emilija M. Simic, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1338 days.

(21) Appl. No.: 12/139,458

(22) Filed: Jun. 14, 2008

(65) Prior Publication Data
US 2009/0310654 A1 Dec. 17, 2009

(51) Int. Cl.
*H04B 1/69* (2011.01)
(52) U.S. Cl.
USPC .......................................................... 375/150
(58) Field of Classification Search .................. 375/136, 375/142–143, 147, 150, E1.02, 130, 140, 375/145, 149, 343; 342/357.2, 357.21, 357.22, 342/357.39, 357.44, 357.64, 357.72, 357.73; 340/426.1, 426.19, 539.1, 539.13; 701/207, 701/213; 370/320, 335, 342
See application file for complete search history.

(56) References Cited

U.S. PATENT DOCUMENTS

| 6,345,073 | B1 * | 2/2002 | Curry et al. .................. 375/265 |
| 6,850,557 | B1 * | 2/2005 | Gronemeyer ................ 375/150 |
| 6,909,738 | B2 * | 6/2005 | Akopian et al. ............. 375/142 |
| 7,127,351 | B2 * | 10/2006 | Norman et al. .............. 701/213 |
| 7,903,719 | B2 * | 3/2011 | Genghi ........................ 375/140 |
| 2004/0057505 | A1 * | 3/2004 | Valio ............................ 375/148 |
| 2004/0190668 | A1 * | 9/2004 | Paik et al. .................... 375/367 |
| 2005/0008106 | A1 * | 1/2005 | Dong-Sik ..................... 375/342 |
| 2005/0010362 | A1 * | 1/2005 | Dong-Sik ..................... 701/213 |
| 2006/0222058 | A1 * | 10/2006 | Simic et al. .................. 375/150 |
| 2006/0245479 | A1 * | 11/2006 | Raman et al. ................ 375/150 |
| 2007/0109189 | A1 * | 5/2007 | Jia et al. .................. 342/357.15 |
| 2007/0195867 | A1 * | 8/2007 | Betz et al. .................... 375/152 |
| 2007/0297497 | A1 | 12/2007 | Seibert et al. |
| 2008/0122692 | A1 * | 5/2008 | Houtman ................. 342/357.12 |
| 2011/0103432 | A1 * | 5/2011 | Tangudu et al. ............. 375/150 |
| 2011/0110384 | A1 * | 5/2011 | Li et al. ........................ 370/479 |

FOREIGN PATENT DOCUMENTS
EP 1801991 6/2007
WO WO2004005954 1/2004

OTHER PUBLICATIONS

International Search Report & Written Opinion—PCT/US2009/047276, International Search Authority—European Patent Office—Jan. 22, 2010.

* cited by examiner

*Primary Examiner* — Tesfaldet Bocure
(74) *Attorney, Agent, or Firm* — Linda G. Gunderson (57) ABSTRACT

Methods and apparatus for code phase processing in a wireless communication device are described herein. A wireless device performs code phase search on a pseudo random code spread signal received over a wireless channel. A correlator correlates the received signal to a plurality of code phases in each of a plurality of frequency hypothesis. A maximum peak and a second peak are determined from the correlation results. Cross correlation processing is performed on the maximum peak and the maximum peak is discarded in favor of the second peak for position processing based on the results of the cross correlation.

26 Claims, 6 Drawing Sheets

MULTIPLE CORRELATION PROCESSING IN CODE SPACE SEARCH

BACKGROUND

Many wireless communication utilize direct sequence spread spectrum to communicate information. The codes used to spread a signal are typically pseudo random codes. A receiver typically recovers the underlying information by correlating the spreading code with a locally generated code. A receiver can sometimes utilize a time offset associated with the codes to establish a timing reference that can be used to perform position location. Determining position based on timing established from pseudo random spread signals is performed in various position location systems.

The Global Positioning System (GPS) navigation system employs satellites that are in orbits around the Earth. Any user of GPS, anywhere on Earth, can derive precise navigation information including 3-dimensional position, velocity and time of day. The GPS system includes at least 24 satellites that are deployed in medium earth orbits with radii of 26,600 kilometers in six planes inclined at 55° with respect to the equator and spaced 60° with respect to one another. Four satellites are equally spaced within each of the six orbit paths. Position measurements using GPS are based on measurements of propagation delay times of GPS signals broadcast from the orbiting satellites to a GPS receiver. Normally, reception of signals from 4 satellites is required for precise position determination in 4 dimensions (latitude, longitude, altitude, and time). Once the receiver has measured the respective signal propagation delays, the range to each satellite is calculated by multiplying each delay by the speed of light. Then, the location and time are found by solving a set of four equations with four unknowns incorporating the measured ranges and the known locations of the satellites. The precise capabilities of the GPS system are maintained by means of on-board atomic clocks for each satellite and by ground tracking stations that continuously monitor and correct satellite clock and orbit parameters.

Each GPS satellite transmits several direct-sequence-coded spread spectrum signals over multiple carriers in the L-band. An L1 signal is positioned at a carrier frequency of 1.57542 GHz, an L2 signal is positioned at 1.2276 GHz, an L3 signal is positioned at 1.38105 GHz, an L4 signal is positioned at 1.379913 GHz, and an L5 signal is positioned at 1.17645 GHz. Civilian accessible signals transmitted on the L1, L2, and L5 frequencies are of most interest in the context of position location and navigation.

The L1 signal consists of two phase-shift keyed (PSK) spread spectrum signals modulated in phase quadrature. The P-code signal (P for precise), and the C/A-code signal (C/A for coarse/acquisition). The L2 signal contains the P-code signal as well as an L2C civilian accessible signal. The P and C/A codes are repetitive pseudo-random sequences of bits (also referred to as "chips") that are modulated onto the carriers. The L2C signal contains two distinct PRN sequences. A first signal, referred to as a CM signal (for Civilian Moderate length code) is 10,230 bits in length, repeating every 20 milliseconds. A CL (for Civilian Long length code) is 767,250 bits, repeating every 1500 milliseconds.

The clock-like nature of these codes is utilized by the receiver in making time delay measurements. The codes for each satellite are unique, allowing the receiver to distinguish which satellite transmitted a given code, even though they are all at the same carrier frequency. Also modulated onto each C/A carrier is a 50 bit/sec data stream that contains information about system status and satellite orbit parameters, which are needed for the navigation calculations. The CM signal is modulated with a 25 bit/sec navigation message with forward error correction, whereas the CL signal is a non-data sequence. The P-code signals are encrypted, and are not generally available for commercial and private users. The C/A signal is available to all users.

The operations performed in a GPS receiver are for the most part typical of those performed in any direct-sequence spread spectrum receiver. The spreading effect of the pseudo-random code modulation must be removed from each signal by multiplying it by a time-aligned, locally-generated copy of the code, in a process known as despreading. Since the appropriate time alignment, or code delay, is unlikely to be known at receiver start-up, it must be determined by searching during the initial "acquisition" phase of a GPS receiver's operation. Once determined, proper code time-alignment is maintained during the "tracking" phase of GPS receiver operation.

Once the received C/A signal is despread, each signal consists of a 50 bit/sec PSK signal at an intermediate carrier frequency. The exact frequency of this signal is uncertain due to the Doppler effect caused by relative movement between satellite and terminal unit, and to local receiver GPS clock reference error. During initial signal acquisition this Doppler frequency must also be searched for, since it is usually unknown prior to acquisition. Once the Doppler frequency is approximately determined, carrier demodulation proceeds.

After carrier demodulation, data bit timing is derived by a bit synchronization loop and the data stream is finally detected. A navigation calculation may be undertaken once the signals from four satellites have been acquired and locked onto, the necessary time delay and Doppler measurements have been made, and a sufficient number of data bits (enough to determine the GPS time reference and orbit parameters) have been received.

One drawback of the GPS system for location determination is the long time needed for the initial signal acquisition phase. As mentioned above, before the four satellite signals can be tracked they must be searched for in a two-dimensional search "space", whose dimensions are code-phase delay, and Doppler frequency shift. Typically, if there is no prior knowledge of a signal's location within this search space, as would be the case after a receiver "cold start", a large number of code delays (about 2000) and Doppler frequencies (about 15) must be searched for each satellite that is to be acquired and tracked. Thus, for each signal, up to 30,000 locations in the search space must be examined. Typically these locations are examined one-at-a-time sequentially, a process which can take 5 to 10 minutes. The acquisition time is further lengthened if the identities (i.e., PN-codes) of the four satellites within view of the receiving antenna are unknown.

In the case where a GPS receiver has already acquired the satellite signals and is then in tracking mode, the position determination process is virtually instantaneous. However, in the routine use of wireless terminals, users turn the power on and quickly begin operation. This may be the case when an emergency communication is intended. In such situations, the time delay associated with a 5 to 10 minute GPS satellite signal acquisition cold-start by a GPS/wireless terminal unit before a position fix can be obtained limits the response time of the system.

Thus, a need remains for a system and method for decreasing the time required to acquire GPS satellite signals and render a position fix in a GPS/wireless terminal unit.

BRIEF SUMMARY

Methods and apparatus for code phase processing in a wireless communication device are described herein. A wireless device performs code phase search on a pseudo random code spread signal received over a wireless channel. A correlator correlates the received signal to a plurality of code phases in each of a plurality of frequency hypothesis. A maximum peak and a second peak are determined from the correlation results. Cross correlation processing is performed on the maximum peak and the maximum peak is discarded in favor of the second peak for position processing based on the results of the cross correlation.

An aspect of the invention includes a method of code phase processing in a wireless communication device. The method includes receiving a pseudo noise spread signal over a wireless channel, correlating the pseudo noise spread signal with a plurality of delayed versions of a local pseudo noise sequence for each of a plurality of frequency hypothesis to generate a plurality of correlation results, determining a maximum peak from the plurality of correlation results, determining a second peak from the plurality of correlation results, and outputting the maximum peak corresponding to a first code phase and first frequency hypothesis and the second peak corresponding to a second code phase and second frequency hypothesis.

An aspect of the invention includes a method of code phase processing in a wireless communication device. The method includes correlating a received signal with a pseudo random code to generate a plurality of correlation results, determining a maximum peak and a best second peak from the correlation results, and determining a cross correlation of the maximum peak to at least one distinct pseudo random code.

An aspect of the invention includes a method of code phase processing in a wireless communication device. The method includes correlating a received signal with each of a multiple of phases of a pseudo random code across each of a plurality of frequency hypothesis to generate a plurality of correlation results, determining a maximum peak greater than a predetermined noise threshold from the plurality of correlation results, determining a second peak based on one of an early peak determined from a first subset of the correlation results or a best other peak determined from a second subset of the correlation results, determining a cross correlation of the maximum peak to at least one additional maximum peak determined from a distinct pseudo random code, and determining a pseudo range based on one of the maximum peak or the second peak based on the cross correlation.

An aspect of the invention includes an apparatus for code phase processing in a wireless communication device. The apparatus includes a peak searcher configured to correlate a received pseudorandom noise spread signal with a plurality of delayed versions of a local pseudo random noise sequence for each of a plurality of frequency hypothesis to generate a plurality of correlation results, and a post processor coupled to the peak searcher and configured to determine a maximum peak and a second peak from the plurality of correlation results for position processing.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

A wireless receiver configured to perform code phase processing, for example, for position location can be configured to determine a maximum peak and a best second peak or some other number of additional peaks for each pseudo random code searched. The maximum peak from each code phase searcher can be processed against other maximum peaks determined for other pseudo random codes to determine whether any of the results represent cross correlation peaks.

Identified cross correlation peaks can be discarded in favor of the one or more additional peaks determined by the code phase searcher. Although the description provided herein focuses on the code phase searcher determining and utilizing a second best peak, any number of best additional peaks may be identified and stored for possible use as an alternative to an identified cross correlation peak. For example, any number, N, of best peaks may be extracted from a code phase search and the best peaks may each be processed for the possibility of the peak resulting from a cross correlation. Each peak identified as a cross correlation peak may be discarded in favor of the next best peak until a peak that is not the product of a cross correlation is identified or all N peaks have been processed.

Identifying the best second peak enables a position processor to proceed with a result from the code phase searcher where the maximum peak was identified as a cross correlation product. Continuing position processing with the best second peak provides additional code space search results in the presence of cross correlation without the need to perform additional code phase searching.

The ability to proceed with position processing using the best second peak can permit faster initial position fix and can permit a successful position fix where limited satellites are in view. The effort to determine and identify the best second peak is substantially less than the effort to re-execute a code phase search. Thus, best second peak processing conserves processing and power consumption within the wireless device.

Figure 1:
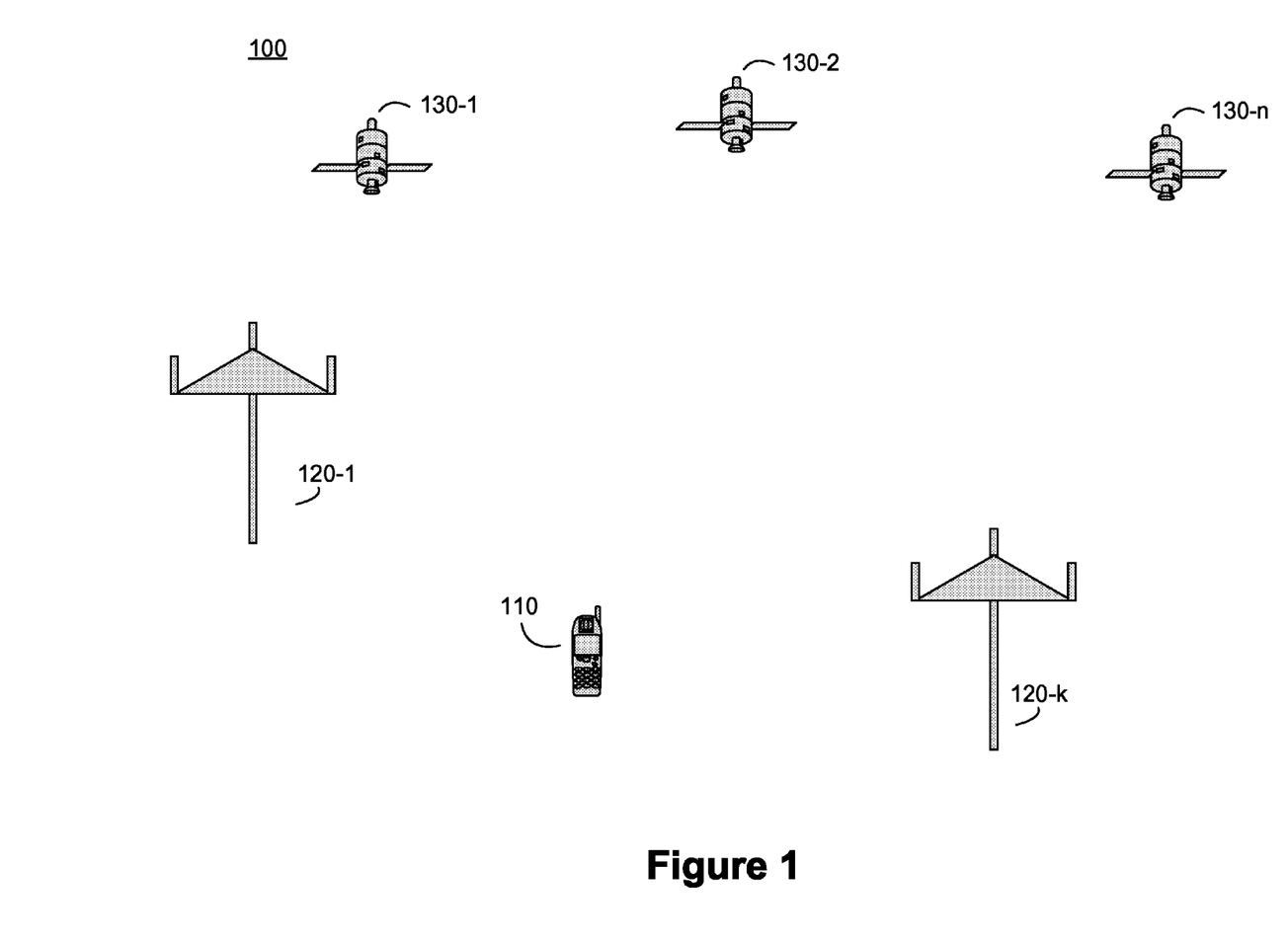
FIG. 1 is a simplified system diagram of an embodiment of a position location system.

FIG. 1 is a simplified functional block diagram of a position location system 100. The position location system 100 includes a plurality of satellites, 130-1 through 130-$n$, that each transmit a signal spread by a distinct pseudo random noise code, also referred to as a pseudo random code, pseudo noise code, PRN code, PN code, or some other similar terminology.

The position location system 100 also includes a plurality of terrestrial stations that can be, for example, bases stations 120-1 through 120-$k$ in a wireless communication system. Each base station, e.g. 120-1, also transmits a signal that is spread by a pseudo noise code. The transmission from the base stations 120-1 through 120-$k$ may be coordinated with the transmissions from the satellites 130-1 through 130-*n*. Alternatively, the base stations 120-1 through 120-*k* may operate substantially independently of the satellites 130-1 through 130-*n*. In a typical hybrid Satellite Positioning System (SPS), the PN codes utilized by the satellites 130-1 through 130-*n* are unrelated to the PN codes used by the terrestrial base stations 120-1 through 120-*k*.

A mobile terminal 110 that is position location enabled may determine its position by receiving the pseudo noise spread signals from a combination of satellites 130 and/or base stations 120 over a wireless channel. The mobile terminal 110 can correlate the phase of the received pseudo noise spread signal with a locally generated pseudo noise code and can determine a pseudo range based on the phase offset.

As described above, the mobile terminal 110 may need to search across the dimensions of phase and frequency for each possible pseudo noise code in order to acquire or otherwise determine the identities of the transmitting sources such that further processing may occur. The acquisition process is further complicated by the mobile terminal's ability to uniquely identify the various pseudo noise codes.

Each of the pseudo noise codes used by a satellite, e.g. 130-1 to spread its signals may be unique, and may be substantially orthogonal to each of the other pseudo noise codes used by other satellites, e.g. 130-2 through 130-*n*. The pseudo noise signals are not truly orthogonal, and there may be some cross correlation properties between any two of the pseudo noise codes. As an example, the pseudo noise C/A Gold codes utilized in a GPS satellite positioning system exhibit cross correlation rejection on the order of 21 dB. That is, a first SPS signal spread by a first PN code may be correlated to a second SPS signal spread by a second, distinct PN code if the received power of the two signals differs by approximately 21 dB. The different channel characteristics affecting signals transmitted by different satellite vehicles to a receiver cause the receiver to receive satellite signals that vary over a dynamic range that exceeds the cross correlation rejection capabilities of the C/A Gold codes.

The mobile terminal 110 may experience wide variations in receive power from the various SPS sources due to various factors. For example, the position of a satellite, e.g. 130-1 in the sky may affect the signal quality and signal power received at the mobile terminal 110. A signal from a satellite, e.g. 130-1, may experience greater path loss when the satellite 130-1 is positioned near the horizon as compared to when the satellite 130-1 is directly overhead of the mobile terminal 110. Additionally, occlusions or other physical factors may affect the wireless channel and the quality of the signal received over the wireless channel. The mobile terminal 110 may be near a building, and the building may substantially shadow the mobile terminal 110 from the view of one or more of the satellites 130. The occluded signals may experience substantial degradation before arriving at the mobile terminal 110. In some cases, the signals traversing from a satellite, e.g. 130-1, to the mobile terminal 11 may traverse multiple paths, including direct and reflected paths.

The mobile terminal 110 can be configured to perform cross correlation processing and can be configured to compensate for cross correlation prior to position processing. The mobile terminal 110 can perform correlation of the received signals to each of multiple pseudo noise codes and can determine and store the two best correlation peaks for each pseudo noise code. The mobile terminal 110 can perform cross correlation processing on the maximum peaks from each of the pseudo noise codes. If a cross correlation result is identified, the mobile terminal 110 can utilize the best second peak from the correlation results of the pseudo noise code for which the maximum peak is identified as a cross correlation result. The cross correlation result can be discarded and position processing may resume with the best second peak. In this manner, the mobile terminal 110 does not incur a substantial penalty for having processed correlation results for the cross correlation signal.

The following is an example described in the context of the mobile terminal 110 processing GPS signals. The methods and apparatus described herein are not limited to SPS nor GPS, but are applicable for virtually any position location system in which pseudo noise codes are utilized for pseudo range measurements.

In order to generate a first fix, such as upon power up, a receiver in the mobile terminal 110 configured to process GPS satellite signals needs to search across all satellite PN-code sequences, all PN-code phase hypotheses, and all Doppler frequency offset hypothesis in order to acquire the necessary satellite signals. On a first fix, the mobile terminal 110 may search over 24 satellites, a predetermined range of Doppler frequencies, and 1023 code hypotheses (which is typically implemented as 2046 discrete half-chip code shifts and calculations). After determining an initial position fix, the mobile terminal 110 can limit the number of frequencies and code phases searched to a subset that is based on the satellite signals used in determining the initial position fix. The mobile terminal 110 can reduce the number of discrete satellite PN-code sequences searched from 24 to the set of satellites actually visible, which is typically 8, but may be as few as 4.

As an example, the mobile terminal 110 may receive SPS signals from satellites 130-1, 130-2, and 130-*n*. For the sake of discussion, assume that the received signal levels at the mobile terminal 110 from two of the satellites, e.g. 130-1 and 130-2 differ by at least the cross correlation rejection value for the pseudo noise codes.

The mobile terminal 110 processes the received signals by correlating the received signals with locally generated versions of pseudo noise codes. The mobile terminal 110 correlates the received signals with a locally generated first pseudo noise code, which may correspond to the pseudo noise code utilized by the first satellite 130-1 to spread the signals.

The mobile terminal 110 can be configured, for example, to generate multiple phase offsets of the first pseudo noise code by generating delayed versions of the pseudo noise code sequence. The received signals can be correlated with each of the locally generated versions of the pseudo noise sequence. The mobile terminal 110 can generate a correlation result for each code phase. The mobile terminal can repeat the correlation process for each of a plurality of frequency hypothesis, where each frequency hypothesis can represent a frequency offset from a nominal center frequency due to Doppler.

The mobile terminal 110 then determines or identifies a maximum peak from the correlation results. Rather than discarding the remaining correlation results, the mobile terminal can also determine or otherwise identify a best second peak from the correlation results.

The mobile terminal 110 can repeat the correlation processing, including determining the maximum peak and best second peak for each of the pseudo noise codes. In the example, the mobile terminal 110 can identify non-noise correlation results for the pseudo noise codes corresponding to the first, second, and nth satellites, 130-1, 130-2, and 130-*n*.

The mobile terminal 110 thus produces a maximum peak and a best second peak corresponding to each of the first pseudo noise code, second pseudo noise code and nth pseudo noise code. The mobile terminal 110 performs cross correlation processing on the maximum peak values. If the mobile terminal 110 determines that one of the peaks is a cross correlation result, e.g. the maximum peak for the second pseudo noise code, the mobile terminal 110 discards the maximum peak from the correlation result and selects the best second peak as the correlation peak for that pseudo noise code. The mobile terminal 110 can proceed with position processing using the selected peaks. For example, the mobile terminal 110 can determine pseudo ranges for each of the selected peaks and can determine a position location solution based on the pseudo range measurements.

Figure 2:
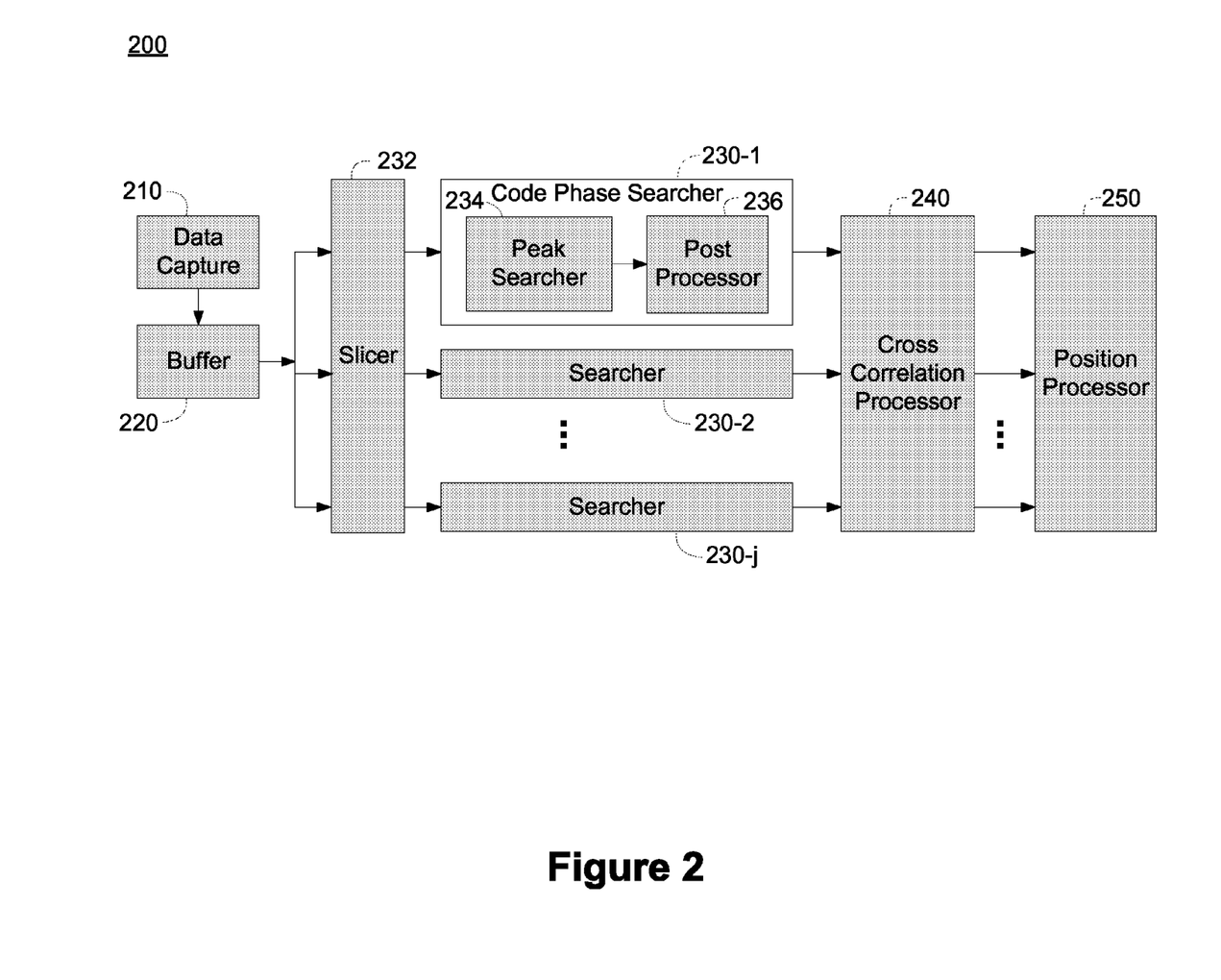
FIG. 2 is a simplified functional block diagram of an embodiment of a receiver.

FIG. 2 is a simplified functional block diagram of an embodiment of a receiver 200, which can be, for example, a position location receiver within the mobile terminal 110 of FIG. 1. The receiver 200 includes a data capture module 210 coupled to a data buffer 220. The data buffer 220 is coupled to a slicer 232 that is coupled to a plurality of searchers 230-1 through 230-j. The outputs from the searchers 230-1 through 230-j are coupled to a cross correlation processor 240. The outputs from the cross correlation processor 240 are coupled to a position processor 250.

The receiver 200 can be configured to search for and process PN coded signals, such as GPS satellite vehicle signals, for position location. The receiver 200 can also be configured to extract multiple peaks for each PN code searched in order to facilitate efficient identification of correlation peaks that are not the product of cross correlations.

In general, the receiver 200 receives a composite signal that can contain signals from a plurality of satellite vehicles, each encoded with a distinct PN code. The searchers 230-1 through 230-j perform searches for each satellite, and in particular for each satellite in view of the receiver 200. The searchers 230-1 through 230-j can each be configured to maintain a list of the N best sorted peaks extracted from each search. The list of peaks extracted from the search may be categorized and ranked according to any number of criteria. For example, each searcher, e.g. 230-1, may compare every detected peak against a noise or detection threshold and may determine if a peak is a result of a jammer or interferer. The processing and ranking performed by the searchers 230-1 through 230-j may be referred to as intra-satellite peak processing.

Once all satellite searches are done and the various searchers 230-1 through 230-j have each established a ranked list of N best peaks, the receiver 200 can perform subsequent processing on the best peaks from each searcher. For example, the cross correlation processor 240 can be configured to compare the best peak from each satellite to best peaks from other satellites pairwise and select the strongest peak that is not caused by a cross-correlation to determine the pseudo range measurement for that satellite. Each peak identified as a cross correlation peak can be discarded in favor of the next best peak identified by the searcher that provided the cross correlation peak.

The receiver 200, and in particular each searcher 230, may extract any number of best peaks. The description of the receiver 200 is generally restricted to the extraction of only two best peaks for the purposes of brevity and clarity. It is apparent from the description of processing two best peaks how processing of additional peaks may be performed.

The data capture module 210 can include those receiver 200 portions related to receiving and processing the received signals. The data capture module 210 can include, for example, an RF frontend that includes a wireless receiver that is configured to receive the pseudo noise code spread signals transmitted by the various SPS sources over the wireless channel. The wireless receiver can filter, amplify and frequency convert the received signals to baseband signals and can sample and convert the baseband signals to a digital representation.

The data capture module 210 can be configured to store the digitized samples in the data buffer 220. The data buffer 220 can be configured to store a predetermined or a variable number of samples. In one embodiment, the data buffer 220 can have a fixed number of locations in which samples may be stored. In another embodiment, the data buffer 220 can be a circular buffer and the number of storage locations in the circular buffer may be dynamically varied based, for example, on a desired integration length of the searchers 230.

The slicer 232 can be configured to distribute the samples to the various searchers 230 based on the configuration of the searchers 230. Each searcher 230 can be configured to correlate samples stored in the buffer 220 and distributed by the slicer 232 against a locally generated pseudo noise code. The searchers 230 can be configured to operate on the same samples from the buffer 220 or can be configured to operate on distinct samples from the buffer 220. In one embodiment, each of the searchers 230 is configured to operate on the same range of samples from the buffer 220, but each searcher 230 is configured to perform correlation to a distinct pseudo noise code. In another embodiment, a plurality of searchers 230 can be configured to operate on distinct subsets of the samples from the buffer 220, but may be configured to search the same pseudo noise code.

Each searcher 230 can have a similar implementation. Each searcher 230 includes peak searcher 234 that is configured to correlate the samples distributed by the slicer 232 against a locally generated pseudo noise code. The peak searcher 234 can be configured to generate a correlation results for each of a plurality of code phases for each of a plurality of frequency hypothesis.

The peak searcher 234 couples each of the correlation results to the post processor 236. The post processor 236 can be configured, for example, to determine the maximum peak and best second peak from the correlation results. The post processor 236 can be configured to identify a search bin, which represents a combination of code phase and frequency offset, as a valid correlation result, a noise result, or a jammer result. The post processor 236 can make the noise determination, for example, based on comparing the correlation result to a threshold. The post processor 236 can make a jammer determination, for example, by examining an array of closely spaced code phase and frequency offset bins. The correlation result from each bin in the array is compared against a threshold, and if all of the bins exceed the threshold, then the bins in the array can be marked as a jammer.

The post processor 236 can determine the maximum peak and best second peak from those bins that are neither marked as noise bins or jammer bins. Additionally, the post processor 236 can be configured to determine the best second peak based on the position of the maximum peak.

The post processor 236 can be configured to determine if an early arriving peak exists, and can determine a best other peak, where the term 'other' refers to a peak other than an early arriving peak. An early arriving peak can occur, for example, where the maximum peak corresponds to a later arriving multi-path component of a composite received signal. The post processor 236 can be configured to limit the search for the early arriving peak to those bins from the correlation results most likely to contain the early arriving peak.

The post processor 236 can determine the early arriving peak, for example, by examining bins that are not identified as jammer bins, within a predetermined allowable region about the maximum peak. The allowable region can be, for example, the allowable region indicated in the code space search region 700 of FIG. 7. The allowable region may occur, for example, within two to four code phase chips earlier than the bin for the maximum peak, and may occur within four frequency hypothesis bins of the maximum peak. The time dimension of the code space search region 700 of FIG. 7 is illustrated in increments of whole chips, but is not limited to whole chips, and correlation results may be determined in increments of partial chip offsets.

Figure 7:
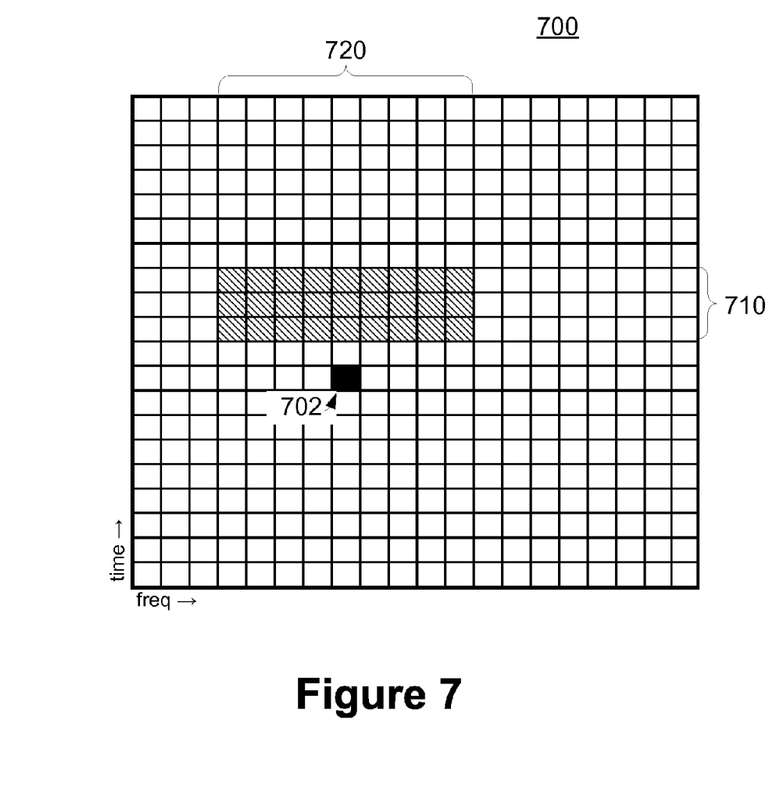
FIG. 7 is a simplified diagram illustrating an example of a restricted code space search region.

FIG. 7 illustrates a code space search region 700 having a bin identified as the maximum peak 702. The time dimension of the allowable region can be configured to occur two to four code phase chips earlier 710 than the maximum peak 702. Additionally, the frequency dimension of the allowable region can be configured to occur within four frequency hypothesis 720, that is plus or minus four frequency hypothesis, of the maximum peak 702. Of course, the actual dimensions of the allowable region may be configured to some other value, and need not occur in even increments of code chips.

Additionally, the post processor 236 can compare candidate correlation results against a predetermined threshold before identifying the correlation result as an early arriving peak. In one embodiment, the post processor 236 can be configured to compare the candidate correlation result against a threshold determined based on the value of the maximum peak, where the value can be, for example, an energy value, a magnitude value, and the like, or some combination thereof, of the correlation result at the maximum peak. For example, a candidate correlation result from the allowable region may need to be within 6 dB of the maximum peak in order to be considered a valid early arriving peak. The post processor 236 can identify the presence of an early arriving peak if the criteria for an early arriving peak are satisfied.

The post processor 236 can determine a best second peak independently of the early arriving peak or can determine the presence of the best second peak conditionally on the absence of a early arriving peak. The best second peak can correspond to the next best peak after the maximum peak that is not a jammer bin and that occurs exclusive of a forbidden region. The forbidden region can be, for example determined based on the position of the maximum peak in order to exclude frequency sidelobes, autocorrelation spurs, or later arriving paths of the maximum peak. The post processor 236 can be configured, for example, to define the forbidden region as shown in the code space search region 800 of FIG. 8.

Figure 8:
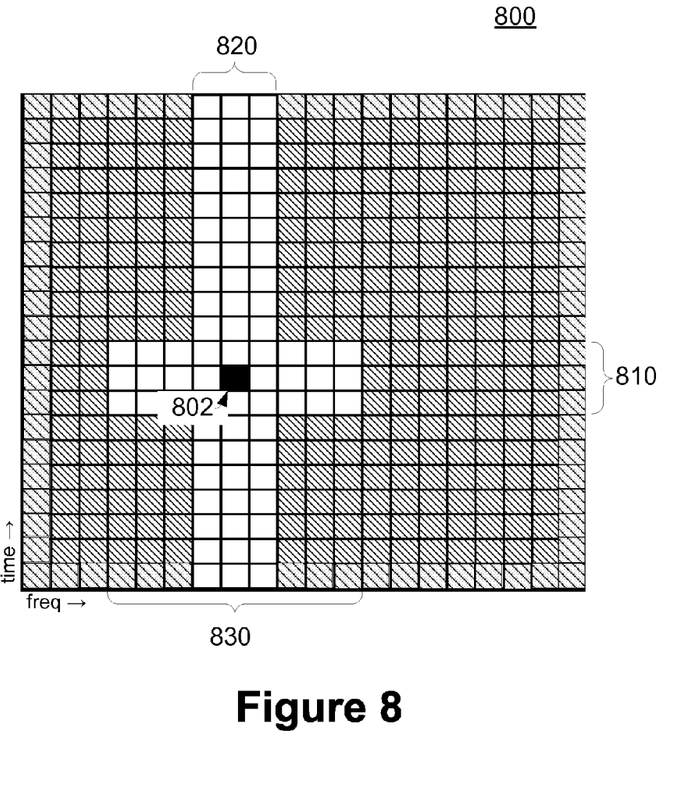
FIG. 8 is a simplified diagram illustrating an example of a restricted code space search region.

The code space search region 800 illustrates a maximum peak 802 and a forbidden region, where the forbidden region includes correlation results within one frequency hypothesis 820 of the maximum peak 802. The forbidden region also can include the correlation results that are a combination of within one code phase hypothesis 810 and within four frequency hypothesis 830 of the maximum peak 802. The time dimension of the code space search region 800 of FIG. 8 is illustrated in increments of whole chips, but is not limited to whole chips, and correlation results may be determined in increments of partial chip offsets.

The post processor 236 can, of course, report greater than a best second peak, and may report any number of peaks. For example, the post processor 236 may identify and report a best third peak, a best fourth peak, or any number of peaks.

In one embodiment, the post processor 236 can be configured to inhibit best second peak processing in the presence of an early arriving peak. In another embodiment, the post processor 236 can be configured to select the early arriving peak as a second peak in the presence of the early arriving peak, and may discard or otherwise ignore the best second peak.

The cross correlation processor 240 can be configured to determine a cross correlation between each pair of maximum peaks from the plurality of searchers 230. The cross correlation processor 240 can be configured to determine the cross correlation of maximum peaks based on, for example, by comparing parameters associated with the maximum peaks, including, but not limited to, Doppler offsets, carrier to noise ratios, signal strengths, and other parameters or some combination of parameters. Alternatively, the cross correlation processor can perform a cross correlation of each received signal with a pseudo noise code that is distinct from the one used to determine the maximum peak in order to identify the possibility of a cross correlation. If the cross correlation processor 240 identifies a maximum peak as a cross correlation, the cross correlation processor discards the maximum peak identified as the cross correlation result. The cross correlation processor 240 can select the best second peak from the searcher 230 having the cross correlation result. The cross correlation processor 240 can, but is not required to, perform cross correlation processing using the best second peak.

The position processor 250 can operate on the selected peaks. For example, the position processor 250 can be configured to determine pseudo range measurement values corresponding to each of the selected peaks.

By utilizing multiple peak processing, the receiver 200 is able to determine a number of distinct correlation results from a single pass of the searchers 230 while allowing for, and correcting for, the effects of potential cross correlation results.

Figure 3:
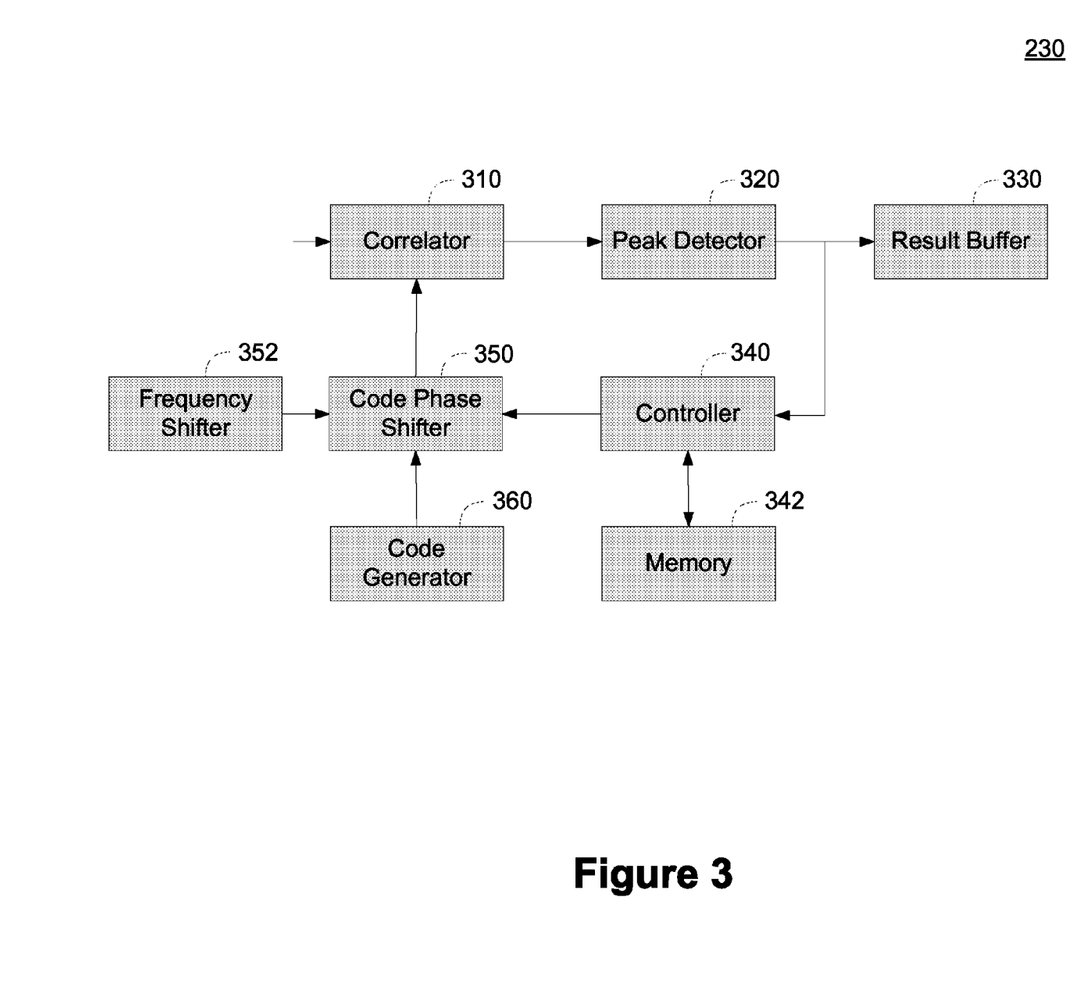
FIG. 3 is a simplified functional block diagram of an embodiment of a code phase searcher.

FIG. 3 is a simplified functional block diagram of an embodiment of a code phase searcher 230. The code phase searcher 230 of FIG. 3 is an alternative embodiment that may be utilized in the receiver of FIG. 2.

The code phase searcher 230 includes a correlator 310 that is configured to receive input samples, for example, from a slicer. The correlator 310 also receives a version of a locally generated pseudo noise code. The correlator 310 correlates the received signal against the locally generated pseudo noise code and couples the correlation result to a peak detector 320.

The peak detector 320 is configured to operate under the control of a controller 340 to determine a maximum peak or a best second peak. The results from the peak detector 320 are stored in the result buffer 330. The controller 340 can be configured to control the peak detector 320 to determine the maximum peak. For example, the controller 340 can determine if the current peak in the peak detector is a maximum peak, and can control the peak detector to store the result in the result buffer 330 if the result is the maximum peak. Similarly, the controller 320 can determine, based on a current determination of a maximum peak, whether a peak in the peak detector 320 or previously stored in the result buffer 330 is a best second peak, which can be an early arriving peak or a best other peak.

The controller 340 can execute one or more computer readable instructions that are stored in computer readable media, such as memory 342. The controller 340, when executing the instructions may execute a method of code phase processing as described herein.

A code generator 360 can be configured to generate a pseudo noise code. The output of the code generator 360 is coupled to a code phase shifter 350 that operates to vary a phase of the pseudo noise code. The code phase shifter 350 can be configured to vary the code phase in increments of a whole pseudo noise chip or in fractions of a pseudo noise chip. A frequency shifter 352 coupled to the code phase shifter 350 can operate to offset the frequency of the signal by increments of a code phase hypothesis. The controller 340 can control the code phase shifter 350 and frequency shifter 352 to enable a code phase search across a predetermined range of code phase (time) dimension and frequency dimension.

Figure 4:
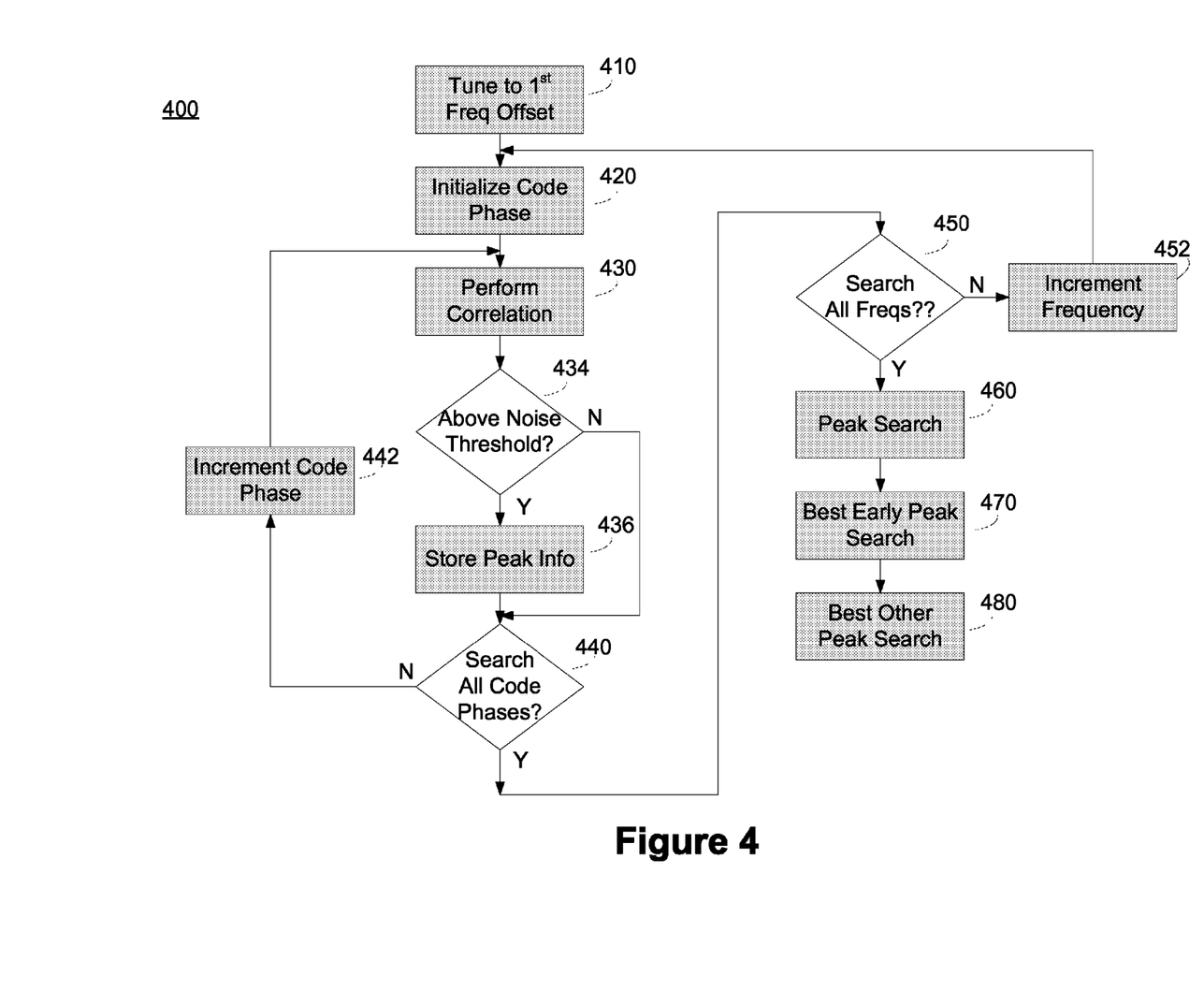
FIG. 4 is a simplified flowchart of an embodiment of a method of multiple correlation peak processing in a code space search.

FIG. 4 is a simplified flowchart of an embodiment of a method 400 of multiple correlation peak processing in a code space search. The method 400 can be performed, for example, by the receiver of FIG. 2 when processing pseudo noise spread signals received over a wireless channel, as depicted in the system of FIG. 1.

The method 400 begins at block 410, where the receiver is configures a frequency offset, such as supplied by the frequency shifter of FIG. 3, to a predetermined offset frequency. The receiver proceeds to block 420 and initializes a code phase of a particular pseudo noise code being searched.

The receiver proceeds to block 430 and determines a correlation of a received signal with the locally generated and phase shifted pseudo noise code at the particular frequency offset. The receiver can, for example, determine an energy associated with the correlation or some other value indicative of the correlation. The receiver proceeds to decision block 434 and determines if the correlation result for the bin, which corresponds to a particular code phase offset and frequency offset, exceeds a predetermined noise threshold.

If, at decision block 434 the receiver determines that the correlation result is greater than the noise threshold, the receiver proceeds to block 436 and stores the peak value for the bin. The receiver proceeds from block 436 to decision block 440. If instead, at decision block 434, the receiver determines that the correlation result is not greater than the noise threshold, the receiver proceeds to block 438 and marks or otherwise identifies the bin as a noise bin. The receiver proceeds from block 438 to decision block 440.

At decision block 440, the receiver determines if all of the desired code phases for the pseudo noise code have been searched. If not, the receiver proceeds to block 442 where the receiver increments the code phase offset. The receiver returns from block 442 to block 430 to compute the next correlation result.

If, at decision block 440 the receiver determines that all desired code phases have been searched, the receiver proceeds to decision block 450 to determine if the entire frequency space has been searched. If not, the receiver proceeds from decision block 450 to block 452 and increments the frequency offset. The receiver returns from block 452 to block 420 to reinitialize the code phase offset and produce the correlation results.

If, at decision block 450, the receiver determines that all frequencies have been searched, the receiver proceeds to block 460 and performs a peak search, where the receiver determines the maximum peak from the correlation results, ignoring any bins that are identified as jammers. The jammer identification is described above, and can be implemented as part of the peak search process or can be implemented prior to and distinct from the peak search process.

After identifying the maximum peak, the receiver proceeds to block 470 and determines a best early peak. After identifying the best early peak, the receive proceeds to block 480 to determine a best other peak. The receiver can return multiple peaks, including the maximum peak and one or more of the best early peak and best other peak for position processing.

Figure 5:
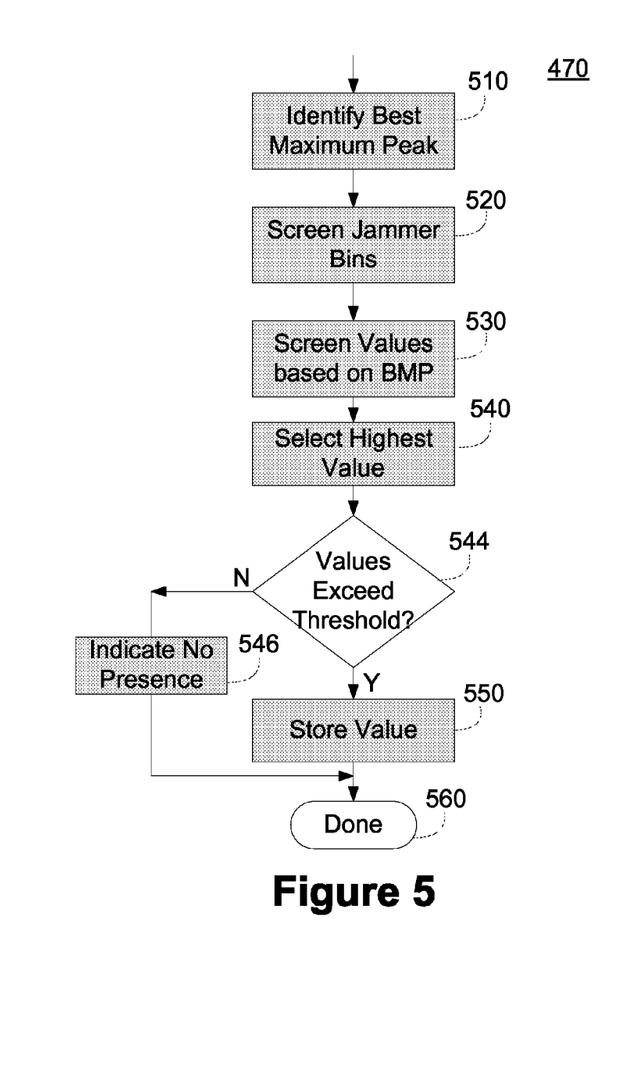
FIG. 5 is a simplified flowchart of an embodiment of a method of best early peak processing.

FIG. 5 is a simplified flowchart of an embodiment of a method 470 of best early peak processing that can be, for example, executed by a receiver when processing the method of FIG. 4.

The method 470 begins at block 510 where the receiver identifies the bin for the maximum peak. The receiver proceeds to block 520 and screens or otherwise eliminates from consideration those bins identified as jammer bins. The receiver proceeds to block 530 and screens the bins to include only those correlation results corresponding to bins within an allowable region. The allowable region can be, for example as shown in FIG. 7. As an example, the allowable region may occur two to four code phase chips earlier than the maximum peak. Additionally, the frequency dimension of the allowable region can be configured to occur within four frequency hypothesis of the maximum peak.

After identifying the allowable region, the receiver proceeds to block 540 and selects the highest non-jammer value in the allowable region. The receiver proceeds to decision block 544 and determines if the peak exceeds a predetermined threshold. The predetermined threshold can be based on the value of the maximum peak. For example, the predetermined threshold can be within 6 dB of the correlation energy of the maximum peak.

If the early arrival peak exceeds the threshold, it is a valid result. The receiver proceeds to block 550 and stores the valid early arriving peak result. The receiver can also set an early arriving peak presence indicator or clear a lack of presence indicator. The receiver proceeds from block 550 to block 560 and is done.

If, at decision block 544 the receiver determines that the peak does not exceed the threshold, the receiver proceeds to block 546 where the receiver indicates a lack of presence of an early arriving peak. The receiver proceeds from block 546 to block 560 and is done.

Figure 6:
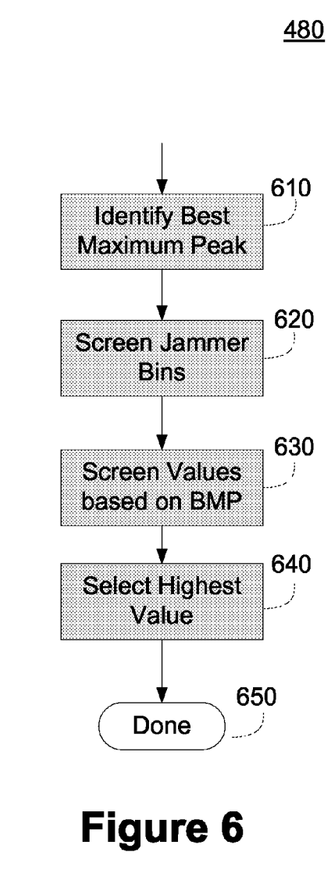
FIG. 6 is a simplified flowchart of an embodiment of a method of best other peak processing.

FIG. 6 is a simplified flowchart of an embodiment of a method 480 of best other peak processing. The method 480 can be, for example, executed by a receiver when processing the method of FIG. 4.

The method 480 beings at block 610 where the receiver identifies the maximum peak from the code space search region. The receiver proceeds to block 620 and eliminates jammer bins from consideration. The receiver proceeds to block 630 and screens the correlation results based on a forbidden region. The forbidden region may include, for example, correlation results within one frequency hypothesis of the maximum peak. The forbidden region can also include the correlation results that are a combination of within one code phase hypothesis and within four frequency hypothesis of the maximum peak.

The receiver proceeds to block 640 and selects or otherwise determines the maximum peak from the region exclusive of the forbidden region. The receiver identifies the value as the best other peak. The receiver proceeds to block 650 and is done.

Methods and apparatus are described herein for multiple peak processing in a wireless device in order to address concerns regarding possible cross correlation of code phase search results. Reporting multiple peaks and selecting one of the multiple peaks based on cross correlation processing can simplify and improve code phase search processing for position location processing.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of code phase processing in a wireless communication device, the method comprising:
   receiving a pseudo noise spread signal over a wireless channel;
   correlating the pseudo noise spread signal with a plurality of delayed versions of a local pseudo noise sequence for each of a plurality of frequency hypotheses to generate a plurality of correlation results;
   determining a maximum peak from the plurality of correlation results;
   determining a second peak from the plurality of correlation results;
   outputting the maximum peak corresponding to a first code phase and first frequency hypothesis and the second peak corresponding to a second code phase and second frequency hypothesis;
   determining a cross correlation of the maximum peak with a peak of a second correlation corresponding to a second pseudo random noise sequence; and
   selecting one of the maximum peak or second peak for position location processing based on the cross correlation.

2. The method of claim 1, wherein determining the second peak from the plurality of correlation results comprises determining an early arriving peak based on the first code phase and first frequency hypothesis.

3. The method of claim 2, wherein determining the early arriving peak comprises:
   identifying bins arriving from two through four chip hypotheses earlier than the maximum peak;
   determining a maximum value from the identified bins;
   comparing the maximum value from the identified bins against a predetermined threshold; and
   identifying presence of the early arriving peak if the maximum value exceeds the predetermined threshold.

4. The method of claim 1, wherein determining the second peak from the plurality of correlation results comprises determining a best other peak as a highest peak from the plurality of correlation results exclusive of frequency sidelobes of the maximum peak.

5. The method of claim 1, wherein determining the second peak from the plurality of correlation results comprises:
   determining a presence or absence of an early arriving peak;
   determining a best other peak, as a highest peak other than the maximum peak, in absence of the early arriving peak; and
   determining the second peak as one of the early arriving peak or the best other peak based on the presence or absence of the early arriving peak.

6. A method of code phase processing in a wireless communication device, the method comprising:
   correlating a received signal with each of a multiple of phases of a first pseudo random code across each of a plurality of frequency hypotheses to generate a plurality of correlation results;
   determining a first maximum peak greater than a predetermined noise threshold from the plurality of correlation results;
   determining a second peak based on one of an early peak determined from a first subset of the correlation results or a best other peak as a highest peak from a second subset of the correlation results;
   determining a cross correlation of the first maximum peak to a second maximum peak determined from a second pseudo random code that is different from the first pseudo random code; and
   determining a pseudo range based on one of the first maximum peak or the second peak based on the cross correlation.

7. The method of claim 6, wherein determining the early peak comprises:
   determining the first subset of the correlation results as including correlation results corresponding to code phases two through four chip hypotheses earlier than a code phase for the first maximum peak;
   determining a maximum value from the first subset;
   comparing the maximum value from the first subset against a predetermined threshold; and
   identifying the maximum value as the early peak and indicating presence of the early peak if the maximum value exceeds the predetermined threshold.

8. The method of claim 7, wherein the predetermined threshold comprises a threshold within 6 dB of a value of the maximum peak.

9. The method of claim 6, wherein determining the best other peak comprises:
   determining the second subset of the correlation results as including correlation results within one frequency hypothesis of the first maximum peak and correlation results within one code phase hypothesis and four frequency hypotheses of the first maximum peak; and
   determining a maximum correlation in the second subset as the best other peak.

10. An apparatus for code phase processing in a wireless communication device, the apparatus comprising:
    a peak searcher configured to correlate a received pseudo-random noise spread signal with a plurality of delayed versions of a local pseudo random noise sequence for each of a plurality of frequency hypotheses to generate a plurality of correlation results;

a post processor coupled to the peak searcher and configured to determine a first maximum peak and a second highest peak relative to the first maximum peak from the plurality of correlation results for position processing; and a cross correlation processor coupled to the post processor and configured to determine a cross correlation of the first maximum peak and a second maximum peak for an additional pseudo random noise sequence, and further configured to output a selected set of peaks.

11. The apparatus of claim 10, wherein the cross correlation processor is configured to select one of the first maximum peak or the second highest peak relative to the first maximum peak for the selected set based on the cross correlation.

12. The apparatus of claim 10, further comprising a position processor coupled to the cross correlation processor and configured to determine a pseudo range value for a plurality of peaks in the selected set of peaks.

13. The apparatus of claim 10, wherein the post processor is configured to determine the second highest peak relative to the first maximum peak by determining a presence or absence of an early arriving peak, determining a best other peak, as a highest peak outside an early arriving region, in absence of the early arriving peak, and determining the second highest peak relative to the first maximum peak as one of the early arriving peak or the best other peak based on the presence of the early arriving peak.

14. An apparatus for code phase processing in a wireless communication device; the apparatus comprising:
means for receiving a pseudorandom noise spread signal over a wireless channel;
means for correlating the pseudorandom noise spread signal with a plurality of delayed versions of a local pseudo random noise sequence for each of a plurality of frequency hypotheses to generate a plurality of correlation results;
means for determining a maximum peak value from the plurality of correlation results;
means for determining a second peak value from the plurality of correlation results; and
means for outputting the maximum peak value corresponding to a first code phase and first frequency hypothesis and the second peak value corresponding to a second code phase and second frequency hypothesis;
means for determining a cross correlation of a maximum peak, corresponding to the maximum peak value, with a peak of a second correlation corresponding to a second pseudo random noise sequence; and
means for electing one of the maximum peak value or the second peak value for position location processing based on the cross correlation.

15. A non-transitory computer readable medium encoded with one or more computer readable instructions, when executed by the computer cause the computer to perform the acts of:
correlating a received signal with each of a multiple of phases of a first pseudo random code across each of a plurality of frequency hypotheses to generate a plurality of correlation results;
determining a first maximum peak greater than a predetermined noise threshold from the plurality of correlation results;
determining a second highest peak relative to the first maximum peak based on one of an early peak determined from a first subset of the correlation results or a best other peak as a highest peak determined from a second subset of the correlation results;
determining a cross correlation of the first maximum peak to a second maximum peak determined from a second pseudo random code different from the first pseudo random code; and
determining a pseudo range based on one of the first maximum peak or the second highest peak relative to the first maximum peak based on the cross correlation.

16. A method of code phase processing in a wireless communication device, the method comprising:
receiving a pseudo noise spread signal over a wireless channel;
correlating the pseudo noise spread signal with a plurality of delayed versions of a local pseudo noise sequence for each of a plurality of frequency hypotheses to generate a plurality of correlation results;
determining a maximum peak from the plurality of correlation results, the maximum peak having a corresponding frequency hypothesis and a corresponding phase code hypothesis;
determining a second peak from the plurality of correlation results by determining a highest peak from the plurality of correlation results exclusive of any result within a forbidden region that comprises at least one of the frequency hypotheses that is within one frequency hypothesis of the maximum peak; and
outputting the maximum peak corresponding to a first code phase and first frequency hypothesis and the second peak corresponding to a second code phase and second frequency hypothesis.

17. The method of claim 16, wherein determining the second peak from the plurality of correlation results comprises determining a best other peak as a highest peak from the plurality of correlation results exclusive of results within one frequency hypothesis of the maximum peak.

18. The method of claim 16, wherein determining the second peak from the plurality of correlation results comprises determining a best other peak as a highest peak from the plurality of correlation results exclusive of results within one code phase hypothesis and within four frequency hypotheses of the maximum peak.

19. An apparatus for code phase processing in a wireless communication device, the apparatus comprising:
a peak searcher configured to correlate a received pseudorandom noise spread signal with a plurality of delayed versions of a local pseudo random noise sequence for each of a plurality of frequency hypotheses to generate a plurality of correlation results; and
a post processor coupled to the peak searcher and configured to determine a first maximum peak and a second highest peak relative to the first maximum peak from the plurality of correlation results for position processing by determining a highest peak from the plurality of correlation results exclusive of any result within a forbidden region that comprises at least one of the frequency hypotheses that is within one frequency hypothesis of the maximum peak.

20. The apparatus of claim 19, wherein the post processor is configured to determine the second highest peak relative to the first maximum peak from the plurality of correlation results exclusive of results within one frequency hypothesis of the first maximum peak.

21. The apparatus of claim 19, wherein the post processor is configured to determine the second highest peak relative to the first maximum peak from the plurality of correlation results exclusive of results within one code phase hypothesis and within four frequency hypotheses of the first maximum peak.

22. An apparatus for code phase processing in a wireless communication device; the apparatus comprising:
- means for receiving a pseudorandom noise spread signal over a wireless channel;
- means for correlating the pseudorandom noise spread signal with a plurality of delayed versions of a local pseudo random noise sequence for each of a plurality of frequency hypotheses to generate a plurality of correlation results;
- means for determining a maximum peak value from the plurality of correlation results;
- means for determining a second peak value from the plurality of correlation results by determining a highest peak value from the plurality of correlation results exclusive of any result within a forbidden region that comprises at least one of the frequency hypotheses that is within one frequency hypothesis from the maximum peak value; and
- means for outputting the maximum peak value corresponding to a first code phase and first frequency hypothesis and the second peak value corresponding to a second code phase and second frequency hypothesis.

23. A computer readable storage medium encoded with one or more computer readable instructions configured to cause the computer to perform the acts of:
- receiving a pseudo noise spread signal over a wireless channel;
- correlating the pseudo noise spread signal with a plurality of delayed versions of a local pseudo noise sequence for each of a plurality of frequency hypotheses to generate a plurality of correlation results;
- determining a maximum peak from the plurality of correlation results, the maximum peak having a corresponding frequency hypothesis and a corresponding code phase hypothesis;
- determining a second peak from the plurality of correlation results by determining a highest peak from the plurality of correlation results exclusive of any result within a forbidden region that comprises at least one of the frequency hypotheses that is within one frequency hypothesis of the maximum peak; and
- outputting the maximum peak corresponding to a first code phase and first frequency hypothesis and the second peak corresponding to a second code phase and second frequency hypothesis.

24. An apparatus for code phase processing in a wireless communication device, the method comprising:
- means for correlating a received signal with each of a multiple of phases of a first pseudo random code across each of a first plurality of frequency hypotheses to generate a first plurality of correlation results and for correlating the received signal with each of multiple of phases of a second pseudo random code, different from the first pseudo random code, across each of a second plurality of frequency hypotheses to generate a second plurality of correlation results;
- means for determining a first maximum peak greater than a predetermined noise threshold from the first plurality of correlation results;
- means for determining a second peak based on one of an early peak determined from a first subset of the first plurality of correlation results or a best other peak as a highest peak from a second subset of the first plurality of correlation results;
- means for determining a cross correlation of the first maximum peak to a second maximum peak determined from the second pseudo random code; and
- means for determining a pseudo range based on one of the first maximum peak or the second peak based on the cross correlation.

25. A non-transitory computer readable storage medium encoded with one or more computer readable instructions configured to cause the computer to perform the acts of:
- correlating a received signal with each of a multiple of phases of a first pseudo random code across each of a first plurality of frequency hypotheses to generate a first plurality of correlation results;
- correlating the received signal with each of multiple of phases of a second pseudo random code, different from the first pseudo random code, across each of a second plurality of frequency hypotheses to generate a second plurality of correlation results;
- determining a first maximum peak greater than a predetermined noise threshold from the first plurality of correlation results;
- determining a second peak based on one of an early peak determined from a first subset of the first plurality of correlation results or a best other peak as a highest peak from a second subset of the first plurality of correlation results;
- determining a cross correlation of the first maximum peak to a second maximum peak determined from the second pseudo random code; and
- determining a pseudo range based on one of the first maximum peak or the second peak based on the cross correlation.

26. An apparatus for code phase processing in a wireless communication device, the method comprising:
- a peak searcher configured to correlate a received signal with each of a multiple of phases of a first pseudo random code across each of a first plurality of frequency hypotheses to generate a first plurality of correlation results and to correlate the received signal with each of multiple of phases of a second pseudo random code, different from the first pseudo random code, across each of a second plurality of frequency hypotheses to generate a second plurality of correlation results; and
- a post processor coupled and configured to:
  - determine a first maximum peak greater than a predetermined noise threshold from the first plurality of correlation results;
  - determine a second peak based on one of an early peak determined from a first subset of the first plurality of correlation results or a best other peak as a highest peak from a second subset of the first plurality of correlation results;
  - determine a cross correlation of the first maximum peak to a second maximum peak determined from the second pseudo random code; and
  - determine a pseudo range based on one of the first maximum peak or the second peak based on the cross correlation.

* * * * *